United States Patent [19]

Kaplan et al.

[11] Patent Number: 4,799,077
[45] Date of Patent: Jan. 17, 1989

[54] COMMON DRIVE FOR SHUTTER BLADES AND OBJECTIVE LENS ASSEMBLY

[75] Inventors: Jonathan I. Kaplan, West Newton; Stephen M. Pero, Medford, both of Mass.

[73] Assignee: Polaroid Corporation, Cambridge, Mass.

[21] Appl. No.: 124,033

[22] Filed: Nov. 23, 1987

[51] Int. Cl.[4] .............................................. G03B 3/00
[52] U.S. Cl. .................................. 354/400; 354/402; 354/195.1; 354/195.11
[58] Field of Search ............ 354/400, 401, 402, 195.1, 354/195.11

[56] References Cited

U.S. PATENT DOCUMENTS

| 3,942,183 | 3/1976 | Whiteside | 354/29 |
|---|---|---|---|
| 4,081,626 | 3/1978 | Muggli et al. | 179/111 R |
| 4,192,587 | 3/1980 | Larocque et al. | 354/27 |
| 4,199,244 | 4/1980 | Shenk | 354/195 |
| 4,278,340 | 7/1981 | Toyama et al. | 354/195 |
| 4,295,715 | 10/1981 | Breen | 354/400 |
| 4,325,614 | 4/1982 | Grimes | 354/23 D |
| 4,355,872 | 10/1982 | Kitai et al. | 354/400 |
| 4,427,276 | 1/1984 | Feinerman et al. | 354/412 |
| 4,494,846 | 1/1985 | Kurosu et al. | 354/400 |
| 4,509,840 | 4/1985 | Johnson et al. | 354/400 |
| 4,653,892 | 3/1987 | Namai et al. | 354/400 |
| 4,671,639 | 6/1987 | Kodaira et al. | 354/400 |
| 4,684,233 | 8/1987 | Kodaira et al. | 354/400 |
| 4,695,144 | 9/1987 | Yoshino et al. | 354/400 |
| 4,702,583 | 10/1987 | Yoshino et al. | 354/400 |
| 4,710,010 | 12/1987 | Namai et al. | 354/400 |
| 4,728,979 | 3/1988 | Akitake et al. | 354/400 |

Primary Examiner—Russell E. Adams
Attorney, Agent, or Firm—John J. Kelleher

[57] ABSTRACT

The shutter blades of a scanning blade shutter and the movable element of an adjustable focus lens in a single lens reflex camera are actuated by a single or common drive. The scanning blade shutter is coupled to the common drive by a rotatably mounted beam member. The movable lens element is also coupled to the common drive through a drive link assembly and the same beam member. Actuation of the beam member by the common drive simultaneously moves the shutter blades in the single lens reflex camera toward their closed positions and moves the lens element coupled thereto by a drive link assembly toward a rangefinder-determined lens focal position. A solenoid coupled to a drive link in the drive link assembly and responsive to rangefinder-derived object distance signals actuates the drive link to uncouple the movable lens element from the beam member when the movable lens element has been moved to a particular focal position determined by the rangefinder. The common drive then moves the shutter blades to their full closed positions after the movable lens element has been uncoupled. The drive link connection between the beam member and the movable lens element is re-established subsequent to film exposure to thereby enable the common drive to return the movable lens element to its initial focal position while moving the shutter of the single lens reflex camera to its full open position.

16 Claims, 4 Drawing Sheets

COMMON DRIVE FOR SHUTTER BLADES AND OBJECTIVE LENS ASSEMBLY

BACKGROUND OF THE INVENTION

The present invention relates to a common shutter blade and lens focusing system drive for a photographic camera, in general, and to such a drive for a single lens reflex camera employing a scanning blade type shutter, in particular.

Photographic apparatus employing shutter blade mechanisms, in general, and scanning blade shutters, in particular, as well as a lens mechanism that may be automatically focused in accordance with a rangefinder-determined camera-to-subject distance are well known in the art. A camera employing a scanning blade shutter and a lens mechanism responsive to a rangefinder-determined subject distance signal is described in, for example, U.S. Pat. No. 4,192,587, entitled "Proportioned Fill Flash", by A. G. La Rocque, et al, issued Mar. 11, 1980, in common assignment herewith. For convenience, the disclosure in said LaRocque et al patent is specifically incorporated herein by reference.

Scanning shutter blade mechanisms are normally driven from a scene light blocking position toward a maximum aperture defining position and thereafter returned to their initial scene light blocking position during an exposure interval. Such scanning blade shutter mechanisms generally comprise a pair of scanning blade shutter elements each having a primary aperture therethrough. The shutter blade elements overlap for reciprocal movement with respect to each other. This movement drives the primary aperture into overlapping relationship with each other so as to define a progressively increasing and then decreasing effective primary aperture. The shutter blade mechanisms are normally driven by a spring and solenoid arrangement as shown in La Rocque et al, supra, or by a microcomputer controlled stepper motor incorporating a digitally encoded scanning blade position sensor as shown, for example, in U.S. Pat. No. 4,325,614, entitled "Exposure Control System With Shutter Operation Controlled by a Microcomputer", by D. L. Grimes, issued Apr. 20, 1982, in common assignment herewith.

Autofocus cameras of the aforementioned type generally embody a motor driven objective lens mechanism which must be stopped at an appropriate focal position corresponding to a previously determined camerato-subject distance. In such cameras, it is desirable to provide a lens position encoder system to identify the instantaneous focal position of a lens element driven by said lens mechanism as it is moved through its plurality of different focal positions in order to precisely position the lens element at a previously determined object-distance-related focal position as shown, for example, in La Rocque et al, supra.

In prior adjustable focus lens cameras employing scanning shutter blades, the objective lens and shutter blade mechanisms are driven by a common drive either that sequentially drives the objective lens and the shutter blades or are driven by separate shutter blade and lens drive means. U.S. Pat. No. 4,278,340 to Toyama et al is an example of such a sequential lens and shutter blade drive and U.S. Pat. No. 4,199,244 to Shenk is an example of a camera employing separate shutter blade and lens drives. In addition, if an encoder system were to be employed in such cameras to determine the instantaneous focal position of the movable lens element as in, for example, La Rocque et al, supra, and the instantaneous blade position of the scanning shutter blades as in, for example, Grimes, supra, the prior art teaches the use of separate encoders for each such position sensing function. The use of duplicate drive means and encoders in an autofocus camera necessarily increases camera cost, size and complexity.

It is a primary object of the present invention, therefore, to provide a single or common drive for a photographic camera that is capable of driving the movable element of an adjustable focus lens to a previously determined lens focal position and of driving a scanning blade type shutter mechanism during an exposure interval.

It is another object of the present invention to provide a rangefinder-derived signal-responsive common drive that is capable of simultaneously driving both the shutter and focusing mechanisms in a single lens reflex camera.

It is a further object of the present invention to provide a single position-encoder that is capable of determining both the instantaneous blade position of a shutter blade mechanism and the instantaneous focal position of the movable lens element in an adjustable focus lens camera.

Other objects and/or advantages of our invention will be made readily apparent by referring to the preferred embodiment thereof described in detail below.

SUMMARY OF THE INVENTION

In accordance with the present invention, a single or common drive is provided that is capable of actuating both the objective lens and shutter and/or aperture mechanisms in an adjustable focus lens camera to a lens focal position corresponding to a previously determined camera-to-subject distance or other desired focal position and through an exposure interval, respectively. The shutter is directly coupled to the common drive and the objective lens mechanism is coupled to the common drive through a drive link assembly. Actuation of the common drive moves the initially open shutter mechanism towards its closed or light-blocking position and moves the objective lens mechanism coupled thereto by said drive link assembly toward a previously determined lens focal position. Means coupled to the drive link assembly and responsive to a signal representative of said previously determined camera-to-subject distance actuates said drive link assembly to uncouple the objective lens mechanism from the common drive when said lens mechanism has been moved to a focal position corresponding to said previously determined camera-to-subject distance. The common drive subsequently moves the shutter mechanism to its full closed position prior to the initiation of a film exposure interval. The drive link assembly connection between the common drive and said objective lens mechanism is re-established subsequent to a film exposure interval to thereby enable the common drive to return the objective lens mechanism to its initial focal position while moving the shutter to its initial open position.

DESCRIPTION OF THE PREFERRED EMBODIMENTS

Figure 1:
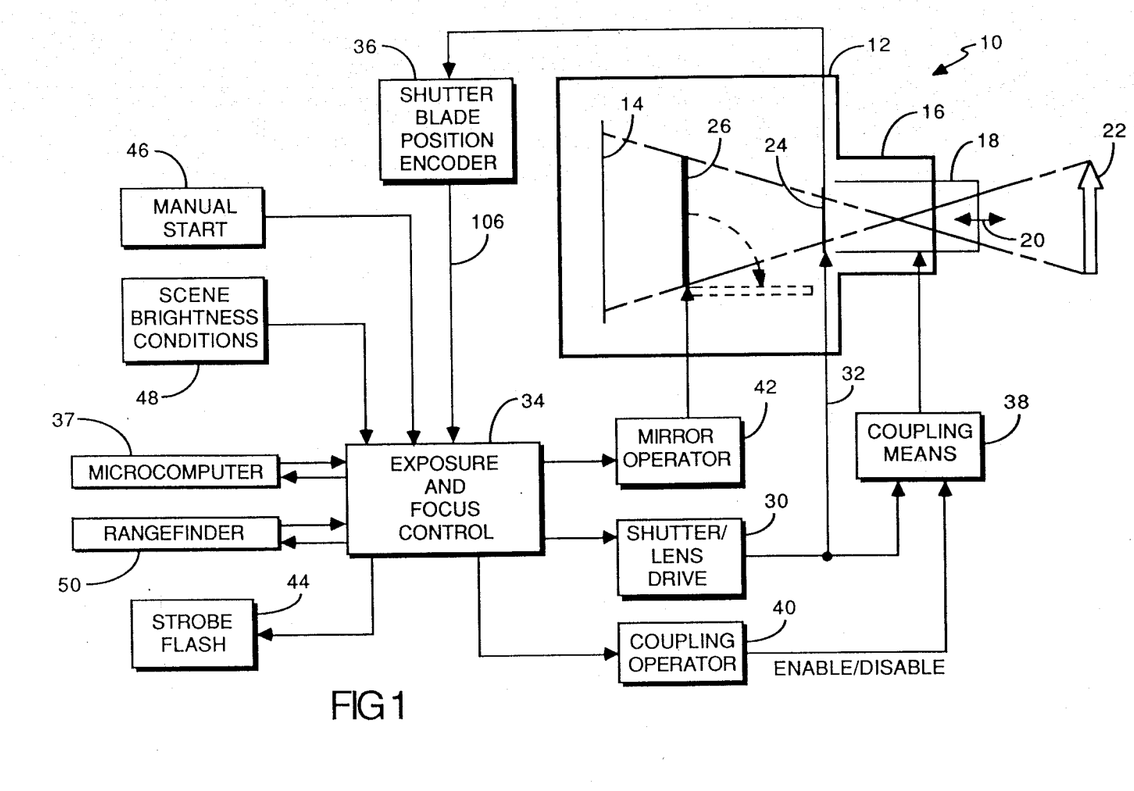
FIG. 1 is a block diagram showing a photographic camera embodying the combination lens and shutter drive of the prevent invention.

Referring now to FIG. 1 of the drawings, there is shown at 10 a block diagram of a photographic camera incorporating a preferred embodiment of the combination lens and shutter drive mechanism of the present invention. Camera 10 is of the single lens reflex type and said camera includes housing 12 within which film is supported at focal plane 14 opposite hub 16. Lens assembly or lens mount 18 is positioned within hub 16 and is displaceable in axial direction 20 to form an in-focus image of subject 22 at said plane 14 when shutter mechanism 24 is actuated to generate an exposure interval after mirror 26 has been moved from its vertical or viewing position to its horizontal or film exposure position (shown in phantom) as functionally illustrated in said drawing FIG. 1. Exemplary of a single lens reflex camera of the type described above is U.S. Pat. No. 3,714,879 to Land et al and of the above-described displaceable or adjustable focus lens camera is the U.S. Patent to Shenk, supra.

Shutter mechanism 24 is driven by shutter/lens drive 30 through path 32 in response to drive signals from exposure and focus control 34 in a closed loop system that includes shutter blade position sensor 36, under the control of microcomputer 37. Lens mount 18 is also driven by said shutter/lens drive 30 through coupling means 38. Coupling means 38 is actuated between its coupled and uncoupled states by coupling operator 40 in response to coupling means control signals from exposure and focus control 34. Similarly, mirror 26 is actuated between its viewing and film exposure positions by mirror operator 42 and strobe flash 44 is fired, in response to mirror position control signals and flash fire signals, respectively, from said exposure and focus control 34. The coupling operator 40, the mirror operator 42 control signals and the flash fire signals from exposure and focus control 34 are also under the control of said microcomputer 37.

Microcomputer 37 is, in turn, responsive to a plurality of inputs. These include manual start input 46 provided in response to an operator manually actuating an exposure cycle start button and automatically provided inputs such as pre-exposure and exposure interval scene brightness conditions, designated 48, and a camera-to-scene distance input, designated 50, which is preferably provided by a sonar ranging system of the type disclosed in commonly assigned U.S. Pat. No. 4,081,626 to Muggli et al. Microcomputer 37 stores a plurality of selectable blade trajectory programs in a manner similar to that described in U.S. Pat. No. 4,427,276 to Feinerman et al and the implementation of any one particular trajectory program is automatically determined, in part, by such microcomputer 37 inputs as rangefinder determined subject distance and scene brightness conditions.

Figure 2:
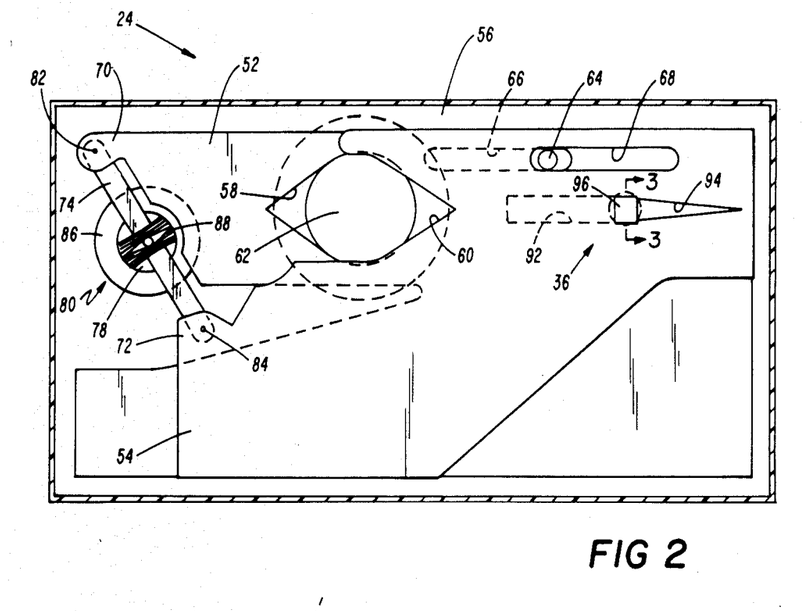
FIG 2 is a front elevational view of the scanning shutter blades and associated drive mechanism of the present invention.

Shutter mechanism 24 functionally illustrated in drawing FIG. 1, is of the scanning shutter blade type, and is shown in much greater detail in drawing FIG. 2. FIG. 2 is a front elevational view of the scanning blade shutter forming said shutter mechanism 24. With respect to FIG. 2, shutter mechanism 24 comprises two overlapping shutter blade elements 52, 54 disposed for reciprocal sliding movement with respect to one another on baseblock 56. Shutter blade elements 52, 54 are respectively provided with scene light admitting primary apertures 58 and 60 to collectively define a progressive variation of effective aperture opening 62 in accordance with the simultaneous longitudinal and lateral displacement of one blade element with respect to the other blade element in a manner as is fully described in U.S. Pat. No. 3,942,183, entitled "Camera With Pivoting Blades" by George D. Whiteside, issued Mar. 2, 1976, in common assignment herewith and now specifically incorporated herein by reference. Effective aperture 62 may be varied between a light blocking and an infinite number of light unblocking positions and is shown in FIG. 2 in its fully open, light unblocking position. The primary apertures 8, 60 are selectively shaped and positioned so as to overlap and form a light entry exposure aperture 62 in baseblock 56 to thereby define said effective aperture 62, of varying size, as a function of the position of blade elements 52, 54.

Projecting from the baseblock 56 at a location spaced laterally apart from light entry exposure aperture 62 in drawing FIG. 2 is pivot pin or stud 64 which pivotally and translatably engages slots 66 and 68 respectively formed near one end of shutter blade elements 52, 54. Pin 64 may be integrally formed with the baseblock 56 and blade elements 52, 54 may be retained in engaging relation with respect to the pin 64 by any suitable retaining means. The opposite ends of blade elements 52, 54 include extended portions 70 and 72, respectively, which pivotally connect to opposite ends of walking beam member 74. Walking beam 74, in turn, is integrally formed with and is located at one end of rotor 78 of galvanometer actuator 80 and said actuator 80 is mounted in a fixed position with respect to said baseblock 56. In the preferred embodiment, walking beam 74 is pivotally connected at its distal ends to the shutter blade elements 52, 54 by coupling pins 82, 84, respectively.

Galvanometer actuator 80 provides the drive force required to displace scanning shutter blades 52, 54 with respect to each other and with respect to baseblock 56 over their complete aperture-forming operational range. Galvanometer actuator 80 is, in effect, a combination d'Arsonval galvanometer and a DC electric motor. Galvanometer actuator 80 includes cylindrically shaped permanent magnet 86 formed of magnetic segments, supported in cylindrically shaped soft iron support structure, that is mounted in a fixed position with respect to camera housing 12 (FIG. 1). The rotor 78, having multiple turn coil 88 wound thereon is mounted for rotation within cylindrically shaped magnet 86 and within the magnetic field of said permanent magnet 86. A rotational force is generated by multiple turn coil 88 and rotor 78 on which said coil 88 is wound in either a clockwise or counterclockwise direction when a DC current having a particular magnitude and direction is passed through said coil 88 by exposure and focus control 34 (FIG. 1) under the control of microcomputer 37 (FIG. 1). Galvanometer actuator 80 has some of the characteristics of an electric motor in that it utilizes the forces produced by a magnetic field on a current-carrying conductor and some of the characteristics of a galvanometer in that the rotor rotates less than one complete revolution when actuated to drive shutter blade elements 52, 54 between their scene light blocking and unblocking positions.

Shutter blade mechanism 24 is provided with analog-type, blade displacement sensing encoder system 36 for continuously monitoring the position of shutter blade elements 52, 54 during the course of an exposure interval. As shown in FIG. 2, encoder system 36 preferably includes laterally extending rectangular and triangular shaped secondary apertures 92, 94 respectively formed in scanning blades 52, 54 for movement therewith. However, other aperture shapes could be employed to form said secondary apertures. Apertures 92, 94 collectively define a progressive variation of effective secondary aperture opening 96 in accordance with the simultaneous lateral displacement of blade element 52 with respect to blade element 54.

Figure 3:
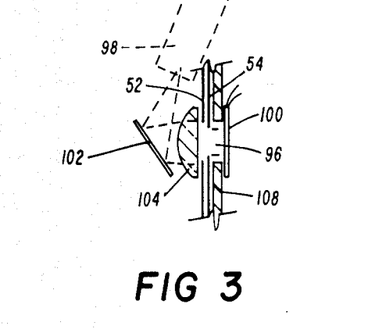
FIG. 3 is a sectional view taken on the line 3—3 in drawing FIG. 2.
Figure 4:
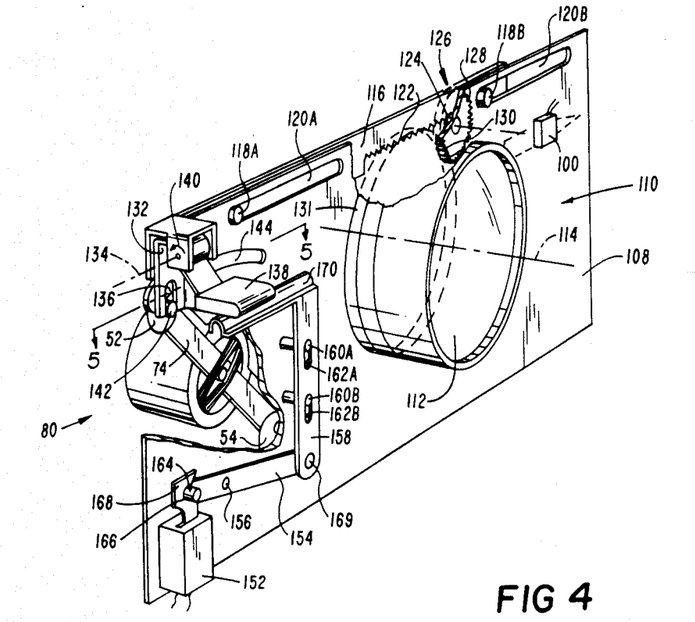
FIG. 4 is a diagrammatic perspective view of the lens and associated lens drive mechanism of the present invention showing portions thereof removed to reveal otherwise hidden structure.

As is more clearly shown in drawing FIG. 3, which is a sectional view taken on the line 3—3 in FIG. 2, encoder system 36 additionally includes light emitting diode 98 and light sensing diode 100 mounted on opposite sides of the combination of shutter blades 52, 54 and lens mounting plate 108 (FIG. 4). In this particular arrangement, light emitted by light emitting diode 98 is directed to light sensing diode 100 through effective secondary aperture opening 96 by reflecting mirror 102 and lens 104. Light emitting diode 98 is energized prior to the initiation of a film exposure cycle actuating shutter blade mechanism 24. Actuation of shutter blades 52, 54 of said shutter mechanism 24 by galvanometer actuator 80 causes a change in the size of effective secondary aperture opening 96 which, in turn, causes a progressive change in the amount of light sensed by the photosensitive surface of light sensing diode 100 through aperture opening 96. An electrical signal representative of the instantaneous position of shutter blade elements 52, 54 in the form of an electrical current is generated by light sensing diode 100 in correspondence with the amount of light sensed by said diode 100. This shutter blade position signal is subsequently transmitted by shutter blade position sensing encoder 36 to exposure and focus control 34 (FIG. 1) through path 106.

As shown in FIG. 4 of the drawings, lens mounting plate 108 is mounted in a fixed position with respect to camera housing 12 (FIG. 1), immediately in front of galvanometer actuator 80, walking beam 74 and shutter blades 52, 54. Adjustable focus lens assembly 110 is mounted in a fixed position on said lens plate 108. Lens assembly 110 includes front lens element 112 that is translatable along optical axis 114 by a conventional cam ring where it serves to focus images of subjects positioned in various locations within a range of subject distances at image plane 14 (FIG. 1) of said single lens reflex camera 10.

Drive link 116 is attached to lens mounting plate 108 by pins 118A and 118B projecting from said drive link 116 and through laterally extending elongated slots 120A and 120B, respectively, for reciprocating movement with respect to said mounting plate 108. A portion of the lower edge of drive link 116 is formed with a gear rack 122 that is meshed with smaller gear 124 of compound gear 126 rotatably mounted on said lens mounting plate 108. Larger gear 128 of said compound gear 126 is, in turn, in mesh with gear 130 formed in the periphery of conventional lens element translating cam ring 131 of lens assembly 110. Latch 132 is attached to that end of drive link 116 remote from gear rack 122, for rotation about latch axis 134. Latch 132 is provided with bifurcation or open slot 136 at one end and lever arm 138 at the other. A spring (not shown) is provided to resist (i.e., to provide a biasing force against) the rotation of latch 132 about latch axis 134 in direction 140.

Figure 5A:
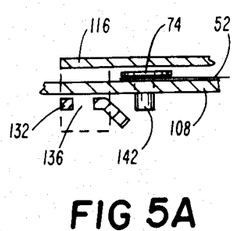
FIGS. 5A, 5B and 5C are sectional views taken on the line 5—5 in drawing FIG. 4 sequentially showing the lens-to-drive coupling means in an uncoupled, a transitional and coupled state, respectively.

Pin 142 projecting from the upper end of walking beam member 74 extends through arcuate clearance slot 144 in mounting plate 108 for limited arcuate movement therein. Pin 142 engages open slot 136 in latch 132 for pivotal movement therein when walking beam member 74 is actuated to drive link 116 through said latch 132. If latch 132 is rotated in direction 140, open slot 136 will move out of engagement with walking beam pin 142. Subsequent rotational movement of walking beam member 74 after slot 136 has been so disengaged, will not be transmitted to drive link 116 nor to front lens element 112 of lens assembly 110 coupled thereto. Also, if walking beam member 74 is uncoupled from latch 132 and is subsequently moved relative to said latch 132, pin 142 will move out of alignment with said slot 136. FIG. 5A, which is a sectional view taken on the line 5—5 in drawing FIG. 4 illustrates such movement. As shown in said FIG. 5A, pin 142 projecting from walking beam 74 has moved laterally away from latch slot 136 under the influence of galvanometer actuator 80 coupled thereto and then latch 132, now in its unlatch state, has biased back to its initial rotational position or the rotational position it assumes when in its walking beam 74 to drive link 116 latch state. The mechanical link between said latch 132 and walking beam 74 is re-established in the following manner as additionally illustrated in drawing FIGS. 5B and 5C.

Figure 5B:
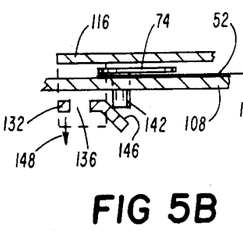
Figure 5C:
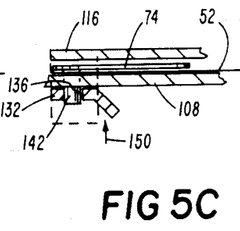

Like FIG. 5A, FIGS. 5B and 5C are also sectional views taken on the line 5—5 in drawing FIG. 4. In FIG. 5B, galvanometer actuator 80 (FIG. 4) initially drives pin 142 projecting from walking beam member 74 toward latch 132. Pin 142 is subsequently driven into cam surface 146 of latch 132, thereby causing the slot 136 portion of latch 132 to cam outward in direction 148 away from mounting plate 108. As pin 142 continues to move toward latch 132, it ultimately becomes aligned with slot portion 136 thereof, as shown in drawing FIG. 5C, thereby enabling slot 136 to pivot inward in direction 150 under the force of the above-noted force bias spring (not shown) of latch 132 to thereby mechanically couple said walking beam member 74 to drive link 116.

As shown in drawing FIG. 4, electrically actuated solenoid 152 is attached, in a fixed position, to lens mounting plate 108 and pivot link 154 is rotatably attached to said plate 108 by pin 156. In addition, L-shaped slide link 158 is attached to mounting plate 108 by pins 160A and 160B projecting from said plate 108 through vertically extending, elongated slide link slots 162A and 162B, respectively, for reciprocating vertical movement with respect to said mounting plate 108. Pin 164 projecting from one end of pivot link 154 engages slot 166 in solenoid armature 168 for pivotal movement therein and the other end of said pivot link 154 is, in turn, pivotally attached to the lower end of said slide link 158 by pin 169. Arm 170 of slide link 158 at the upper end of said link 158 is in sliding contact with the bottom surface of the lever arm 138 portion of latch 132. The function of link arm 170 is to maintain contact between slide link 158 and latch arm 138 whenever drive link 116 moves in slots 120A and 120B relative to said slide link 158. When electrical solenoid 152 is energized, armature portion 168 is electromagnetically attracted downward, causing pivot link 154 to rotate about pin 156 and thereby cause link 158 to slide upward on support pins 160A, 160B. This upward motion of slide link 158 is transferred to lever arm 138 through link arm 170, causing latch 132 to rotate in direction 140 and thereby uncouple drive link 116 from walking beam member 74.

DISCUSSION

Figure 6:
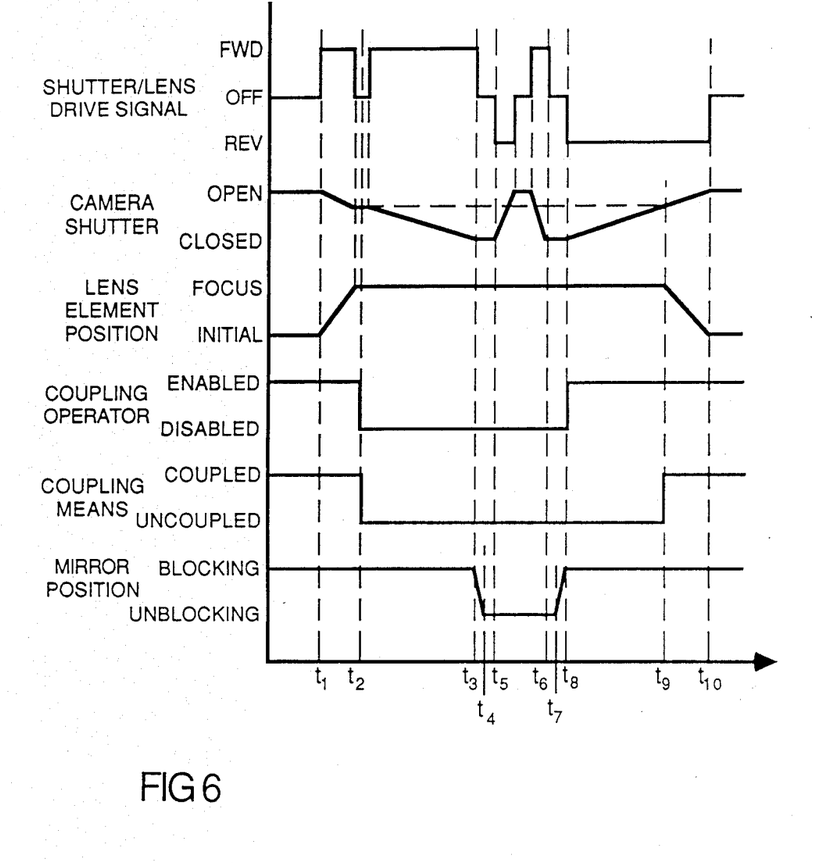
FIG. 6 is a timeline showing a typical operational sequence of various lens and shutter drive related elements in the camera of FIGS. 1-5.

A typical combined lens and shutter drive operational sequence will now be described in detail with respect to the above-described drawing FIGS. 1–5 and with respect to drawing FIG. 6, which is a time line showing the sequence of operation of various lens and shutter drive related elements of single lens reflex camera 10. Prior to the initiation of a typical exposure sequence employing the combined lens and shutter drive of the present invention, it should be noted that shutter mechanism 24 is in its full open position, walking beam member 74 is mechanically coupled to drive link 116 through latch 132 and mirror 26 is in its viewing or blocking position precluding any and all scene light from reaching image plane 14.

A lens focusing and film exposure sequence is initiated by an operator actuation of manual start 46. The actuation of manual start 46 causes initial scene brightness conditions to be determined by light sensing means (not shown) within scene brightness condition determining means 48 and causes rangefinder 50 to ultrasonically produce an electrical signal representative of subject distance. As shown in the time line of FIG. 6, at $t_1$ which occurs subsequent to the determination of initial scene brightness conditions and subject distance, exposure and focus control 34 under the control of microcomputer 37 generates a forward shutter/lens drive signal causing galvanometer actuator 80 to translate front lens element 112, through drive link 116, to the focus position determined by rangefinder 50. The focus position of lens element 112 is sensed by shutter blade encoder system 36 in that blades 52, 54 are directly coupled to said lens element 112 through walking beam member 74 and drive link 116.

When lens element 112 of lens assembly 110 has been driven to the desired focal position just prior to $t_2$ by galvanometer actuator 80, solenoid 152 is energized at $t_2$ by exposure and focus control 34, causing the downward movement of solenoid armature 168 to rotate pivot link 154 about pin 156 and slide link 158 to move vertically upward on pins 160A and 160B. The upward movement of slide link 158 is transferred to arm 138 of latch 132 by arm 170 of slide link 158 to thereby rotate latch 132 out of engagement with walking beam 74 as said latch 132 is rotated in direction 140 by such slide link 158 movement. After latch 132 has been disengaged from drive link 116, galvanometer actuator 80, moving in the same direction, drives shutter mechanism 24 to its full closed position at $t_3$. It should be noted that the forward drive signal to galvactuator 80 is interrupted just prior to $t_2$ or when lens element 112 has reached the desired focal position, and during the period of time that walking beam 74 is being uncoupled from drive link 116.

Mirror 26 is actuated to its unblocking position between times $t_3$ and $t_4$ by mirror operator 42 and microcomputer controlled exposure and focus control 34. A shutter mechanism 24 actuating exposure interval is initiated at $t_5$ and terminated at $t_6$ by exposure and focus control 34 in correspondence with the blade aperture size versus time trajectory program stored within microcomputer 37 that, if the sensed lighting conditions deem it necessary, includes the firing of scene illuminating strobe flash 44. Mirror 26 is then returned to its scene light blocking position between $t_7$ and $t_8$ and coupling operator 40 is enabled by de-energizing solenoid 152 at said time $t_8$. In addition, at $t_8$, a reverse shutter/lens drive signal is also generated by microcomputer controlled exposure and focus control 34 causing galvanometer actuator 80 to drive shutter blades 52, 54 in shutter mechanism 24 toward their open or light unblocking positions.

As galvanometer actuator 80 continues to move shutter mechanism 24 toward its full scene light unblocking position, pin 142 projecting from galvactuator coupled walking beam 74 engages cam surface 146 (FIG. 5B) of latch 132, causing slot 136 formed therein to pivot outward in direction 148 away from lens mounting plate 108. At time $t_9$ with pin 142 moving in the same direction, said pin 142 becomes aligned or is moved into registration with latch slot 136. When this occurs, the said slotted end of latch 136 is pivoted inward in direction 150 (FIG. 5C) under the force of the latch 132 bias spring (not shown) as said pin 142 enters said slot 136. At this time, drive link 116 and movable lens element 112 once again become mechanically coupled to galvanometer actuator 80 through latch 132. Galvanometer actuator 80 continues to drive shutter mechanism 24 to its full open position while simultaneously driving the now-coupled movable lens element 112 toward its initial focus position. At time $t_{10}$, shutter mechanism 24 has been moved to its full open position, movable lens element 112 has been moved to its initial focus position, and the shutter/lens drive signal from microcomputer controlled exposure and focus control 34 has been terminated.

As hereinabove described, a single actuator (galvanometer actuator 80) has been employed to simultaneously drive the blade elements of a shutter mechanism while at the same time driving the movable element of an adjustable focus lens to a desired focus position during at least a portion of the shutter blade actuation cycle. In addition, it should be noted that, with the exception of pin 142 projecting from walking beam 74, movable element 112 of lens assembly 110 and all of the means coupling said lens element to walking beam 74 are uncoupled from said walking beam 74 prior to the initiation of an image forming exposure interval. By uncoupling lens element 112 from walking beam 74 in this manner, inertial loading of galvanometer actuator 80 that might otherwise alter a programmed aperture size versus time scanning blade trajectory, is thereby precluded.

It will be apparent to those skilled in the art from the foregoing description of our invention that various improvements and modifications can be made in it without departing from its true scope. The embodiments described herein are merely illustrative and should not be viewed as the only embodiments that might encompas our invention.

What is claimed is:

1. A photographic camera, comprising:

means for defining a focal plane;

an adjustable focus lens for directing scene light along a given path to said focal plane, said lens having a movable element mounted for displacement over a given operational range for adjustment of said lens to focus images of subjects positioned in various locations within a range of subject distance at said focal plane;

a blade mechanism;

means for mounting said blade mechanism for displacement between a blocking arrangement precluding transmission of scene light along said given path to said focal plane and an unblocking arrangement, said blade mechanism including at least one blade portion displaceable during displacement of said blade mechanism;

means for detecting each progressive position of said one blade portion and for deriving an electrical signal representative of each such progressive blade position;

means for producing a subject distance signal representative of the distance between said camera and a particular subject within said focusing range;

drive means actuatable for displacing said blade mechanism between its said blocking and unblocking arrangements;

a light blocking member actuatable between light blocking and unblocking positions for independently controlling scene light transmission along said given path from said lens to said focal plane;

a drive link assembly for coupling said movable lens element to said blade mechanism, said assembly being actuatable between a first arrangement where said lens element is uncoupled from said blade mechanism and a second arrangement where said lens element becomes coupled to said blade mechanism; and energizeable control means for actuating said drive means to initially displace said blade mechanism toward its said blocking arrangement in preparation for exposure while simultaneously displacing said movable lens element coupled thereto from an initial toward a particular focus position, to then displace said blade mechanism toward its said unblocking arrangement and back again so as to define an exposure interval during which scene light is transmitted to the focal plane and for finally actuating said light blocking member for its said light unblocking position to its said light blocking position subsequent to said exposure interval, said control means including means responsive to said subject distance signal and said blade position signal for actuating said drive link assembly to its said first arrangement during initial displacement of said blade mechanism to uncouple said lens element from said blade mechanism when said lens element has been positioned to a particular subject distance related focus position, and responsive to a signal indicating the end of an exposure interval for actuating said light blocking member to its said light blocking position, for actuating said drive means to displace said blade mechanism toward its said unblocking arrangement, and for actuating said drive link assembly to its said second arrangement to couple said lens element to said blade mechanism so as to simultaneously return said movable lens element and said blade mechanism to their respective initial position.

2. The invention of claim 1 wherein said blade mechanism includes a pair of scanning blade shutter elements mounted in an overlapping relationship for reciprocal movement with respect to one another, with each element having a primary aperture therethrough and with said reciprocal movement defining a progressively increasing and then decreasing effective primary aperture to thereby provide an exposure interval.

3. The invention of claim 1, wherein said control means includes means for generating an electromagnetic force inducing electrical current corresponding to a desired blade mechanism aperture size versus time trajectory curve and said drive means comprises:
    a pair of permanent magnets of opposite polarity mounted in a spaced relation, said magnets having a magnetic field of predetermined intensity established therebetween; and
    a rotor coupled to said blade mechanism, said rotor including a coil of electrical wire coupled to said control means and supported for limited rotation within said magnetic field in response to said electrical current.

4. The invention of claim 1, wherein said means for detecting each progressive position of said one blade comprises:
    said one blade includes an encoder aperture disposed for displacement along a predetermined path in correspondence with the displacement of said one blade; and
    a light emitting device and a light sensing device mounted in a spaced relation on opposite sides of the said encoder aperture displacement path for providing an output signal indicative of the progressive position of said one blade when the light emitted by said light emitting device is transmitted to said light sensing device by way of said encoder aperture as said encoder aperture moves along said predetermined path.

5. The invention of claim 4, wherein said blade mechanism includes a pair of shutter blades with each such blade incorporating an encoder aperture disposed for displacement along a predetermined path, in an overlapping relationship, between said light emitting and light sensing devices, in correspondence with its associated shutter blade, for progressively varying the amount of light transmitted therebetween to thereby provide an output signal indicative of the position of said shutter blades relative to one another.

6. The invention of claim 1, wherein said means for producing a subject distance signal representative of subject distance is an ultrasonic rangefinder.

7. The invention of claim 1, wherein said light blocking member is a mirror actuatable between said light blocking position where it reflects an image of a scene to be photographed for scene framing and focusing purposes and a reflex position where it permits scene light transmission between said lens and said focal plane.

8. The invention of claim 1, wherein said control means comprises:
    means for deriving an electrical signal representative of scene lighting conditions;
    means for storing a plurality of different trajectory signal programs defining corresponding blade trajectory curves that are appropriate for different photographic conditions;
    means responsive to a program of trajectory signals for actuating said blade mechanism drive means in a manner whereby the operation of said blade mechanism coupled thereto is characterized by an aperture size versus time trajectory curve defined by said program of trajectory signals; and means responsive to said scene lighting conditions signal for selecting the appropriate trajectory signal program from said storage means and feeding a correlated program of trajectory signals to said blade mechanism driving means.

9. The invention of claim 1, wherein said drive link assembly comprises:
- a rotatably mounted compound gear having large and small diameter gear portions;
- an elongated member mounted for reciprocating movement having an edge portion in the form of a rack gear with its gear teeth in mesh with the small diameter gear portion of said compound gear;
- a lens mount for supporting and translatably focusing said movable lens element, said lens mount having gear teeth formed at its periphery with said gear teeth being in mesh with the teeth of said large diameter gear portion wherein reciprocating movement of said elongated member is coupled to said lens element for lens element focusing movement;
- a latch assembly for coupling said drive means to said elongated member comprising a pin member coupled to said drive member and a latch member pivotally attached to an end portion of said elongated member having a recess therein for receiving said pin member; and
- an electrical solenoid responsive to said blade position and subject distance signals and coupled to said latch member, actuatable between an uncoupled condition where said pin member is precluded from entering said latch member recess and a coupled condition where said pin member is permitted to enter said latch member recess to thereby couple said drive means to said elongated member.

10. The invention of claim 1, wherein said photographic camera is a single lens reflex camera.

11. A photographic camera comprising:
means defining a focal plane;
an adjustable lens for directing scene light along a given path to said focal plane, said lens including a movable element displaceable over a given operational range for adjustment of said lens to focus an image at said focal plane of a subject at a location determined in accordance with a subject distance signal;
an exposure control mechanism including at least one blade member displaceable over a select path to facilitate control of the passage of scene light to said focal plane;
drive means actuatable for displacing said blade member along its select path;
coupling means operable, responsive to a first signal, for coupling said movable lens element to said blade member for displacement therewith and, responsive to a second signal for decoupling said lens element from said blade member;
means for producing said first signal for coupling said lens element to said blade member, and for actuating said drive means for displacement of said blade member along its said select path for movement of said lens element therewith; and
means responsive to said subject distance signal for producing said second signal to decouple said lens element from said blade member when said lens element is displaced to a suitable location for focusing an image of a subject located at a distance represented by said subject distance signal.

12. The invention of claim 11 including means for detecting the progressive displacement of said blade element and for deriving a blade position signal in accordance therewith, and wherein said means responsive to said subject distance signal includes means responsive to said blade position signal for producing said second signal to decouple said lens element when said blade position signal represents a blade displacement sufficient to displace said lens element to its said suitable location in accordance with said distance subject signal.

13. The invention of claim 12 wherein said subject distance signal defines the displacement of said blade element necessary to displace said lens element to a suitable location in accordance with subject distance, and said means responsive to said subject distance signal incudes means responsive to a blade position signal selected in accordance with said subject distance signal for producing said second signal to decouple said lens element from said blade element.

14. The invention of claim 13 wherein said blade member is actuatable for displacing said blade member from an initial position toward a terminal position and subsequently back to its said initial position, and said first signal is provided prior to displacement of said blade member from its initial position so as to displace said lens element from an initial position upon displacement of said blade member, said second signal is provided during displacement of said blade member toward its said terminal position so as to release said lens element at a focus position, and said first signal is subsequently provided during a displacement of said blade member back to its initial position so as to carry said lens element back to its said initial position.

15. A photographic method for use with photographic apparatus having an exposure mechanism including a blade member displaceable over the camera exposure path from an initial position towards a terminal position and back toward its initial position, and an adjustable focus lens including a lens element displaceably mounted for adjustment of said lens to focus images of subjects positioned at various distances from the camera on the camera focal plane, said method comprising the steps of:
- coupling said lens element to said blade member so that said lens element is in an initial position when said blade element is in its initial position;
- moving said blade member toward its said terminal position;
- decoupling said lens element from said blade member during its movement in accordance with the distance of a subject from the camera so as to position said lens element at a location for focusing said subject at the focal plane of said camera; and
- recoupling said lens element to said blade member as said blade member is returned to its said initial position so as to return said lens element to its said initial position in anticipation of subsequent movement of said blade element.

16. The method of claim 15 wherein said camera is an SLR camera and includes a displaceable reflex member for varying said camera between a viewing mode in which said reflex member blocks the taking path and an exposure mode in which said reflex member is in unblocking relation to the exposure path, and said initial position of said blade member is a full open position of said exposure mechanism which is utilized for viewing in the viewing mode of said camera, and said recoupling step includes the coupling of said lens element to said blade member as said blade member is moved toward its initial position for viewing purposes and said decoupling step includes decoupling said lens element from said blade member as said blade member is moved toward its terminal position prior to varying of said camera to said exposure mode.

* * * * *